United States Patent [19]
Uchino et al.

[11] Patent Number: 5,126,295
[45] Date of Patent: Jun. 30, 1992

[54] SILICON NITRIDE POWDER, SILICON NITRIDE SINTERED BODY AND PROCESSES FOR THEIR PRODUCTION

[75] Inventors: Koichi Uchino; Yukihiko Nakajima; Myuki Nakamura; Hideki Hirotsuru, all of Omuta, Japan

[73] Assignee: Denki Kagaku Kogyo Kabushiki Kaisha, Tokyo, Japan

[21] Appl. No.: 510,587

[22] Filed: Apr. 18, 1990

[30] Foreign Application Priority Data

Jun. 7, 1989 [JP] Japan .................. 1-142970
Nov. 6, 1989 [JP] Japan .................. 1-288549

[51] Int. Cl.$^5$ .............. C04B 35/58; C04B 35/20; C04B 35/22
[52] U.S. Cl. .......................... 501/97; 501/94; 501/96; 501/98; 501/154; 423/344
[58] Field of Search .......... 501/94, 96, 97, 98, 501/154; 423/344

[56] References Cited

U.S. PATENT DOCUMENTS

4,640,903  2/1987  Matsuhiro et al. .......... 501/97
4,946,630  8/1990  Ezis .......................... 264/65

Primary Examiner—William R. Dixon, Jr.
Assistant Examiner—Michael A. Marcheschi
Attorney, Agent, or Firm—Oblon, Spivak, McClelland, Maier & Neustadt

[57] ABSTRACT

A silicon nitride powder prepared by nitriding a metallic silicon powder and having the following physical characteristics (1) to (3):

(1) the oxygen content in the form of a solid solution is at most 0.5% by weight,
(2) the specific surface area is from 6 to 16 m$^2$/g, and
(3) the content of fine powder of at most 0.2 μm is at most 7% by volume.

21 Claims, 2 Drawing Sheets

SILICON NITRIDE POWDER, SILICON NITRIDE SINTERED BODY AND PROCESSES FOR THEIR PRODUCTION

BACKGROUND OF THE INVENTION

1. Field of the Invention

The present invention relates to a silicon nitride powder which is readily sinterable to present a sintered body excellent in high temperature flexural strength and toughness, a silicon nitride sintered body obtained therefrom, and processes for their production. The silicon nitride sintered body is a material excellent in the high temperature strength, hardness, corrosion resistance and impact resistance and expected to be widely used as various structural parts. For example it is expected to be useful for gas turbine parts, nozzles or bearings.

2. Discussion of Background

As conventional methods for the production of silicon nitride powders, (1) a method of directly nitriding metallic silicon, (2) a method of reducing and nitriding silica and (3) a silicon halide method are known. The powders prepared by these methods have substantial differences in the sinterability of the powders or in the properties of the sintered bodies after the sintering such as the high temperature flexural strength, probably because of the different production histories, even when the amounts of metallic impurities, the amounts of oxygen, the particle sizes or specific surface areas are similar.

Generally, the powder produced by the method (1) is readily sinterable, but is poor in the high temperature flexural strength, the powder prepared by the method (2) is hardly sinterable, and the powder prepared by the method (3) is said to show an intermediate performance. Such nature is largely dependent on the oxygen content in the form of a solid solution, which constitutes about 60% of the total amount of oxygen.

Since a grinding step is involved in the preparation of powder according to the method (1), the oxygen content in the form of a solid solution usually exceeds 2% by weight, in many cases, and at least 1.5% by weight of such oxygen is contained. In the method (1), the oxygen content in the form of a solid solution can be reduced by conducting a step of e.g. acid treatment for the removal of impurities. Even then, it is difficult to reduce such oxygen to a level of less than 1.0% by weight. On the other hand, in the case of the powder according to the method (2), silica will remain as a silica powder is used as the starting material, and it is usual that the oxygen content in the form of a solid solution exceeds 2% by weight.

With respect to the crystal forms, there are two types i.e. an $\alpha$-phase and a $\beta$-phase. It i said that the higher the content of the $\alpha$-phase, the better from the viewpoint of a general sintering mechanism of silicon nitride, such that the $\alpha$-phase is dissolved once in a liquid phase and subsequently becomes super-saturated and precipitates as the $\beta$-phase. However, the growth of prismatic crystals during the precipitation of prismatic crystals resulting from the transition of the $\alpha$-phase to the $\beta$-phase, is not uniform, and there is a drawback that fine densification will be hindered by abnormal crystal growth.

The above-mentioned powders are about all that are presently available. As a matter of course, the amount of oxygen in the powder is influential over the sinterability of the powder and over the properties of the sintered body. Further, various other powder properties such as the specific surface area, the crystallinity, the particle shape, the granularity (fine powder), etc. are involved. Thus, it is not clearly understood how the powder properties according to the above-mentioned respective methods are related to the powder properties.

Japanese Examined Patent Publication No. 43311/1986 discloses the relation between the amount of oxygen in the silicon nitride powder and the high temperature flexural strength. This prior art proposes to reduce the amount of oxygen in the silicon nitride powder to present a sintered body excellent in the high temperature flexural strength. However, (i) no clear description is given as to various properties other than the oxygen content, such as the amount of fine powder which is inevitable in the method of grinding a silicon nitride, the metallic impurities and the specific surface area, probably because a hot press (HP) sintering method is employed, (ii) in the method for producing a powder having a low oxygen content, the special treatment brings about a high cost, and HP which is not commonly used, is employed as the sintering method, as mentioned above, (iii) no detailed discussion is made as to the reason for specifying the species of the sintering aid and as to the structure of the sintered body, which may be attributable to the performance of the high temperature flexural strength, (iv) the high temperature flexural strength is at a level of 600 MPa at best, and (v) there is no disclosure of the influences of the oxygen content in the form of a solid solution and the oxygen content in the form of a hydroxide or oxide, over the high temperature flexural strength.

On the other hand, Japanese Unexamined Patent Publication No. 145380/1990 discloses a relation between the conversion rate to $\beta$-phase and the particle size within a range of the $\beta$-phase content of from 30 to 100%. However, in this method, the total oxygen content is high, and accordingly the transition from $\alpha$ to $\beta$ during the sintering tends to take place easily even at a low temperature. Further, there has been a problem that the amount of the grain boundary phase constituted by the sintering aid is likely to be large, whereby the solubility of silicon nitride changes, and only $\beta$-prismatic crystals having a very small aspect ratio will be formed, and the toughness will not be improved.

SUMMARY OF THE INVENTION

It is an object of the present invention to produce a silicon nitride powder by the above-mentioned method (1).

Another object of the present invention is to obtain a silicon nitride sintered body having a high temperature flexural strength of at least 700 MPa at 1,200° C., by using the silicon nitride powder produced by the above-mentioned method (1).

A further object of the present invention is to obtain a silicon nitride sintered body having high toughness, particularly a toughness of at least 8.0 MPa·m$^{\frac{1}{2}}$, by using the silicon nitride powder produced by the above method (1).

The present inventors have conducted various studies to accomplish the above objects. As a result, they have succeeded in producing a silicon nitride powder having the oxygen content, the specific surface area, the average particle size, the fine powder content and the metallic impurities controlled, by nitriding a metallic silicon powder under a special gas atmosphere, and at the same time they have found a sintering aid excellent in the compatibility with the silicon nitride powder and a structure contributing to the development of the high temperature flexural strength and the high toughness of the sintered body. The present invention has been accomplished on the basis of these discoveries.

The present invention provides a silicon nitride powder prepared by nitriding a metallic silicon powder and having the following physical characteristics (1) to (3):

(1) the oxygen content in the form of a solid solution is at most 0.5% by weight, (2) the specific surface area is from 6 to 16 m$^2$/g, and (3) the content of fine powder of at most 0.2 μm is at most 7% by volume.

The present invention also provides a process for producing a silicon nitride powder, which comprises nitriding a metallic silicon powder in an atmosphere containing nitrogen and/or ammonia to obtain a silicon nitride ingot and grinding the ingot, wherein the silicon nitride ingot is prepared by supplying at least one halide selected from the group consisting of alkali metal halides and alkaline earth metal halides, in a gas state continuously, intermittently or at once, and then grinded.

Further, the present invention provides a silicon nitride powder composition comprising said silicon nitride powder and a sintering aid.

Furthermore, the present invention provides a silicon nitride sintered body comprising β-prismatic crystals having an aspect ratio of from 10 to 25 and a diameter of less than 0.5 μm as determined by the scanning electron microscopic (SEM) observation and β-prismatic crystal having an aspect ratio of from 10 to 17 and a diameter of from 0. 5 to 3.0 μm as determined by the SEM observation.

Still further, the present invention provides a process for producing a silicon nitride sintered body, which comprises molding the above silicon nitride powder composition, followed by sintering in an inert gas atmosphere at a temperature of from 1,600° to 1,800° C. for from 2 to 6 hours.

DETAILED DESCRIPTION OF THE PREFERRED EMBODIMENTS

Silicon nitride powder

In the present invention, among the above mentioned three methods (1) to (3) for the production of silicon nitride powders, the method (1) i.e. the method of directly nitriding metallic silicon is adopted for the reason that the starting material is readily available as compared with the other methods, and yet this method is suitable for mass production.

The first condition required for the silicon nitride powder of the present invention is that the oxygen content in the form of a solid solution (hereinafter referred to as an internal oxygen content) is at most 0.5% by weight.

If the internal oxygen content exceeds 0.5% by weight, the composition of the grain boundary phase will be changed when the silicon nitride particles are dissolved in the grain boundary phase comprising a sintering aid, etc. during the sintering step of silicon nitride, whereby precipitation and growth of β-prismatic crystals will be hindered, and no adequate development of the sintering properties, particularly the high temperature flexural strength, will be expected.

A preferred internal oxygen content is at most 0.3% by weight. The method for measuring the internal oxygen content will be described hereinafter.

The second condition required for the silicon nitride powder of the present invention is that the specific surface area is from 6 to 16 m$^2$/g.

In the present invention, the specific surface area has been specified with a view to attaining handling efficiency, viscosity, etc. suitable for various molding methods such as press molding, injection molding and slip casting. Namely, if the specific surface area is less than 6 m$^2$/g, the grains tend to be coarse, and the sinterability will accordingly be poor. If it exceeds 16 m$^2$/g, the powder itself will be bulky, whereby the handling efficiency tends to be poor, and the viscosity which is important for injection molding will be high, such being undesirable.

More specifically, if the specific surface area is less than 6 m$^2$/g, the particles tend to be large, whereby the sintering density can not be increased, and the high temperature strength can not be improved. On the other hand, to obtain a specific surface area exceeding 16 m$^2$/g, excessive grinding is required. Consequently, the fine powder content tends to increase, whereby β-prismatic crystals having a high aspect ratio tend to hardly form, and no remarkable improvement of the high temperature flexural strength can be expected.

The third condition required for the silicon nitride powder of the present invention is that the content of fine powder of at most 0.2 μm is at most 7% by volume.

The results of experiments conducted by the present inventor show that even if a silicon nitride powder satisfies the above first and second conditions, no adequate high temperature flexural strength will be obtained if it contains a substantial amount of fine powder of at most 0.2 μm. In this respect, from the investigation of the relation between the structure of the sintered body and the fine powder content, it has been found that the aspect ratio of β-prismatic crystals in the sintered body decreases as the fine powder content increases. It is understood that the number of nuclei during the precipitation from the melt of α-silicon nitride increases as the fine powder increases, whereby the aspect ratio of β-prismatic crystals in the sintered body decreases. Namely, the present inventors have found that the aspect ratio of β-prismatic crystals plays an important role for the development of the high temperature flexural strength, and the fine powder of at most 0.2 μm (which is believed to be silicon nitride containing a large amount of oxygen) is influential to the aspect ratio of the β-prismatic crystals.

Namely, in the present invention, the content of fine powder of at most 0.2 μm is specified to be at most 7% by volume, because if it exceeds the specified limit, the aspect ratio of β-prismatic crystals tends to be small, and the high temperature flexural strength tends to be low. The smaller the fine powder content, the better. Preferably, it is at most 3% by volume.

In the present invention, the particle size is specified to be at most 0.2 μm simply because of the limitation in the measuring method presently available. It is quite likely that super fine powder of at most 0.1 μm is influential.

Now, more preferred characteristics for the silicon nitride powder of the present invention will be described.

Firstly, the average particle size is preferably within a range of from 0.3 to 0.8 μm.

The average particle size is very important particularly when pressure less sintering (PLS) is employed. If the average particle size exceeds 0.8 μm, the solubility of silicon nitride in a composite oxide formed by the reaction of a sintering aid such as yttrium oxide ($Y_2O_3$), magnesium oxide (MgO) or aluminum oxide ($Al_2O_3$) with oxygen contained in the silicon nitride powder, tends to be low, whereby the densification tends to be inadequate. On the other hand, if the average particle size is less than 0.3 μm, the solubility in the grain boundary phase formed by the sintering aid, tends to increase, whereby the number of β-nuclei increases, the densification tends to be inadequate, and it will be difficult to obtain, by PLS, a sintered body sufficiently durable at high temperatures.

The average particle size used in the present invention is the 50% size of the volume % measured by CAPA-700 manufactured by Horiba Seisakusho K. K.

The content of α-phase in the silicon nitride powder of the present invention is preferably at least more than 70%. more preferably at least 80%.

The sintering mechanism of silicon nitride is basically such that α-silicon nitride is once dissolved in a liquid phase and then super-saturated and consequently precipitated as β-silicon nitride. Therefore, it is desirable that the α-phase content in the silicon nitride powder is high. Namely, the α-phase content is preferably at least more than 70%, more preferably at least 80%. If the α-phase content is 70% or less, β-prismatic crystals having a high aspect ratio tends to hardly precipitate, and the high temperature flexural strength tends to hardly be improved.

The α-phase content in the present invention is determined by obtaining peak intensities $I\alpha_{102}$ and $I\alpha_{210}$ for the α-phase and $I\beta_{101}$ and $I\beta_{210}$ for the β-phase, by X-ray diffraction and calculating the α-phase content by the following equation.

$$\alpha\text{-phase content} = \frac{(I\alpha_{102} + I\alpha_{210})}{(I\alpha_{102} + I\alpha_{210} + I\beta_{101} + I\beta_{210})} \times 100$$

Further, the content of metallic impurities in the silicon nitride powder, particularly the total content of Fe, Al and Ca, is preferably at most 1,000 ppm, more preferably at most 500 ppm. If the content exceeds 1,000 ppm, the creep strength at high temperatures tends to be low when the product is used at high temperatures for a long period of time.

In order to increase the sinterability and obtain a silicon nitride sintered body having superior toughness, it is preferred that the α-phase content of the silicon nitride of the present invention is at most 70%, and the β-phase content is at least 30%.

The amount of oxygen content in the form of a hydroxide or oxide in the silicon nitride powder of the present invention (hereinafter referred to as a surface oxygen content), is preferably from 0.5 to 2.0% by weight, more preferably from 0.7 to 1.2% by weight. The reason is as follows.

The above-mentioned silicon nitride powder having a small internal oxygen content of a level of at most 0.5% by weight and a high α-phase content, has a small surface oxygen content for forming the grain boundary phase by the reaction with the sintering aid. Therefore, the high level of the high temperature flexural strength will be obtained only when a special sintering aid, for example, a sintering aid having a function to facilitate the diffusion, such as MgO or $MgO \cdot Al_2O_3$ (spinel), is employed. Whereas, a silicon nitride powder having a surface oxygen content of from 0.5 to 2.5% by weight and a high α-phase content, is capable of forming the grain boundary phase irrespective of the type of the sintering aid and capable of providing a high level of the high temperature flexural strength, although its internal oxygen content is as small as at most 0.5%.

The surface oxygen content and the internal oxygen content of the present invention can be measured in accordance with the following method. Firstly, the total oxygen content in the silicon nitride powder is measured by the nitrogen/oxygen determinator (TC-136, manufactured by LECO Corporation). Then, a 10% by weight hydrofluoric acid aqueous solution is added to the silicon nitride powder, and the mixture is stirred in a constant temperature water tank for 20 minutes. By using filter paper No. 5C (JIS P-3801), non-decomposed residue was filtered off from this solution to obtain a filtrate. A part of this filtrate was analyzed by an atomic absorption analyzer to obtain the amount of eluted $SiO_2$.

In this case, partial elution of silicon nitride is conceivable by the following reaction:

$$Si_3N_4 + 4H_2O + 18HF \rightarrow 3H_2SiF_6 + 4NH_4OH$$

Therefore, the filtrate is separately subjected to steam distillation, whereupon the amount of $NH_4^+$ is obtained by indophenol blue absorptiometry, and the surface $SiO_2$ content is obtained by subtracting from the amount of eluted $SiO_2$, the amount of $SiO_2$ corresponding to $NH_4^+$, whereupon the surface oxygen content is calculated. The internal oxygen content is obtained by subtracting the surface oxygen content from the total oxygen content of the silicon nitride powder.

To obtain such a silicon nitride powder of the present invention, a silicon nitride powder having an internal oxygen content of at most 0.5% synthesized by nitriding a metallic silicon powder, is subjected to heat treatment at a temperature of from 600 to 1,200° C. in an atmosphere of from 0.05 to 0.8 atm of partial pressure of oxygen gas ($PO_2$) by means of e.g. a rotary kiln, a screw furnace or a batch furnace. In this case, the silicon nitride powder having an internal oxygen content of at most 0.5% by weight can be obtained by nitriding a metallic silicon powder while supplying a halide gas to obtain a silicon nitride ingot, which is then grinded, as will be described hereinafter.

Process for producing a silicon nitride powder

The silicon nitride powder of the present invention can be produced by a process which comprises nitriding a metallic silicon powder in an atmosphere containing nitrogen and/or ammonia by supplying at least one halide selected from the group consisting of alkali metal halides and alkaline earth metal halides, in a gas state continuously, intermittently or at once, to obtain a silicon nitride, ingot and then grinded.

Now, the process of the present invention will be described in detail.

The particle size of the metallic silicon powder to be used in the present invention is preferably at most 88 μm. The reason why metallic silicon having such a relatively large particle size can be used, is substantially related to the fact that as will be described hereinafter, not all the reaction of the metallic silicon with the nitrogen source is a solid-gas reaction but after some solid-gas reaction at the surface, nitriding proceeds by a gas-gas reaction. Namely, in the present invention, even with metallic silicon having a particle size as large as 88 μm, once a part of the surface is nitrided by a solid-gas reaction, breakage of metallic silicon takes place due to the difference in the density of the metallic silicon and the α-silicon nitride to form fine metallic silicon. However, if the particle size exceeds 88 μm, although the same phenomenon takes place, the temperature at which the solid-gas reaction takes place at the surface tends to be high, and free Si tends to remain under usual nitriding conditions, such being undesirable. There is no particular limitation to the lower limit. Namely, the smaller the average particle size of the metallic silicon powder, the more readily the below-mentioned SiO(G) tends to form, whereby the gas-gas reaction will be promoted, and the desired granulated α-silicon nitride ingot will readily be obtained. The oxygen content in the metallic silicon powder is preferably as small as possible, particularly at most 0.2% by weight. The starting material of the present invention may be the above-mentioned metallic silicon powder alone, or a powder mixture having up to 20 parts by weight of a silicon nitride powder incorporated relative to 100 parts by weight of the above-mentioned metallic silicon powder.

Now, the reaction to obtain the silicon nitride powder of the present invention will be described in further detail.

The present inventors have found that the reaction of the metallic silicon powder with nitrogen is governed by a gas-gas reaction of a $N_2$—$NH_3$ or $N_2$—$H_2$ system involving $O_2$ rather than a solid-gas reaction, and they have studied various reactions for the formation of $Si_3N_4$ in which SiO(G) is involved. One example will be given below. As reported by Kato [Akio Kato; Journal of Powder Engineering Association, Vol. 18, No. 1, p. 36–45 (1980)], the form of the solid formed by such a gas-gas reaction substantially influences the super saturation degree i.e. log kp. Namely, log kp at 1,300° C. is about 1.6 in the following formula (1), while it is about 46 in the following formula (2).

Thus, as to the euhedral of silicon nitride formed by these two reactions, it is considered that whiskers are produced by the formula (1), and granules are formed by the formula (2).

$$3SiO(G) + 4NH_3(G) = Si_3N_4(S) + 3/2O_2(G) + 6H_2(G) \quad (1)$$

$$3Si(G) + 4NH_3(G) = Si_3N_4(S) + 6H_2(G) \quad (2)$$

Further, the following formulas (3) to (6) show the reactions up to the formation of Si(G) taking an example of $CaF_2(G)$ as well as the recycling reactions of the microscopic crystal site thereof:

$$Si(S) + 1/2O_2(G) \rightarrow SiO(G) \quad (3)$$

$$SiO(G) + CaF_2(G) + H_2(G) \rightarrow Si(G) + CaO(S) + 2HF(G) \quad (4)$$

$$3Si(G) + 4NH_3(G) \rightarrow Si_3N_4(S) + 6H_2(G) \quad (5)$$

$$(CaO(S) + 2HF(G) \rightarrow CaF_2(G) + H_2(G) + 1/2O_2(G)) \quad (6)$$

As is evident from these formulas, it is possible that the gas of a halide accompanying the gas is recycled in the microscopic crystal site. In fact, even with the gas of a halide in an amount of not more than equivalent, a sufficient effect for granulation was observed. Thus, it is conceivable that the oxygen source (such as SiO(G)) taken into during the nitriding is small, and the internal oxygen content will accordingly be small. Then, a research has been conducted for a gaseous compound having a stronger affinity to oxygen than SiO(G). As a result, it has been found that when a gas of a halide of each of an alkali metal and an alkaline earth metal is intentionally supplied when the metallic silicon powder is nitrided while introducing a gas atmosphere containing nitrogen and/or ammonia, the resulting silicon nitride will be in the form of granules rather than whiskers. With respect to the concentrations of the alkali metal and alkaline earth metal halides, as is evident from the above reaction formulas, 1 mol of the gas of the alkaline earth metal halide, or at least 2 mol of the alkali metal halide, relative to 1 mol of Si(S), is sufficient. The nitriding is not completed in a single operation, and therefore the concentration may practically be less than the above.

With respect to the manner of introduction, for example, the alkali metal or alkaline earth metal halide is introduced in a separate furnace and then heated, sublimated and supplied together with nitrogen into the furnace wherein the silicon nitride powder is introduced, while adjusting the concentration. Otherwise, it is also possible that in the furnace wherein the metallic silicon powder is introduced, a predetermined amount of the above halide is placed in the vicinity of the metallic silicon powder, and the nitriding of the metallic silicon powder and the sublimation of the halide are conducted simultaneously. The manner of supply is not limited to such specific examples. Further, the mode of introduction is not limited to the above examples, and either separate introduction or simultaneous introduction of a mixture may be employed.

Further, as to the timing for the supply, it may be supplied continuously, intermittently or at once at the nitriding temperature i.e. at a temperature within a range of from 1,150° C. to 1,450° C. The intermittent supply or the supply at once can be conducted by a proper combination of the operations of the opening and closing of the supply lines to the above-mentioned furnaces for sublimation and for nitriding. Such intermittent supply or supply at once is based on the understanding that in the microscopic crystal site, the above-mentioned halide gas introduced as described below, is circulated in the system. In fact, when the above halide is introduced at a temperature of up to 1,350° C. and thereafter the supply of the gas was stopped, the form of the resulting silicon nitride was not changed from the form obtained when the supply was continued up to 1,450° C.

The above-mentioned alkali metal and alkaline earth metal halides include, for example, fluorides, chlorides and bromides of Li, Na, K, Mg, Ca, Sr and Ba elements. Particularly preferred are fluorides of Ca, Mg and Li. The reason is that their affinity to oxygen is stronger than Si in respect of the relation between the standard energy for the formation of an oxide and the temperature, and as a result, the above-mentioned granulation will further be facilitated.

The above-mentioned halides may be used alone or in combination as a mixture of two or more different types.

There is no particular restriction as to the nitriding furnace. For example, a batch furnace, a continuous pusher furnace, a continuous rotary kiln, a continuous screw furnace, or a fluidized bed may be used.

Figure 1:
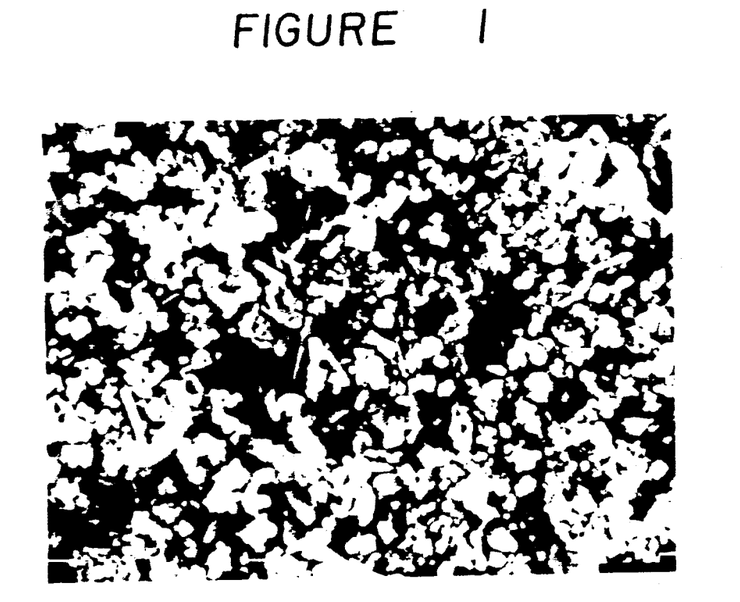
Figure 2:
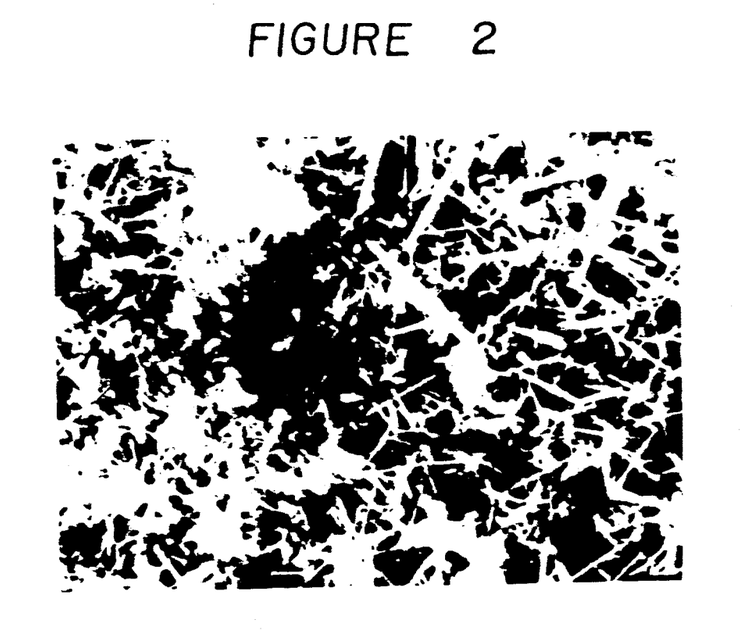
Figure 3:
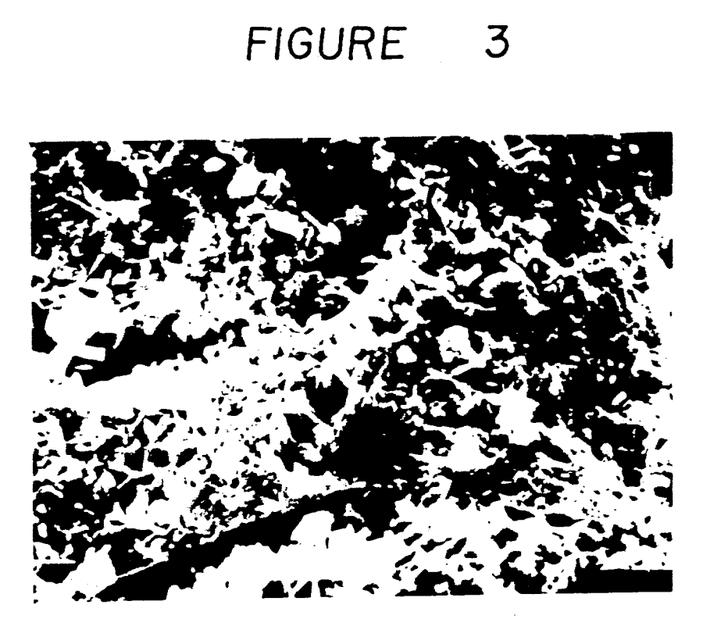

The granular silicon nitride ingot of the present invention and the whisker-form silicon nitride ingot outside the scope of the present invention, are shown in FIGS. 1 and 2, respectively. Further, FIG. 3 illustrates a typical form obtained by a solid-gas reaction by the method of directly nitriding metallic silicon, i.e. polymorphism. FIGS. 1, 2 and 3 are scanning electron microscopic (SEM) photographs with 3,500 magnifications.

As is evident from these photographs, FIG. 1 shows particles substantially smaller than the silicon powder used and more rounded than the silicon powder. Further, it is evidenced that the gas-gas reaction took place. Further, it is believed that the internal oxygen content is also small, since the product is formed from Si(G) rather than from SiO(G).

FIG. 2 also indicates that the whiskers in FIG. 2 were formed by a gas-gas reaction. However, probably due to an inadequate super saturation degree of SiO(G), it takes a form wherein needle-like crystals are substantial. FIG. 3 clearly shows that firstly sintering of Si powder itself took place, and subsequently nitrogen diffused and nitriding proceeded.

With the granular silicon nitride ingot obtained by the present invention, the grinding proceeds in such a manner that the granular crystals as shown in FIG. 1 ar disintegrated as opposed to the grinding of the whiskers or needle-like crystals as shown in FIG. 2 wherein such whiskers or needle-like crystals are physically crashed. Thus, formation of fine powder resulting from the grinding of the ingot is little. Accordingly, the resulting silicon nitride powder will be similar to an isometric powder free from fine powder obtainable by the silicon halide method. Specifically, it is a silicon nitride ingot which presents, when crashed and milled by means of usual crasher and mill, particles having a particle size of at most 0.2 mm and a specific surface area, of from 2 to 5 $m^2/g$, and which has an internal oxygen content of at most 0.5% by weight.

As the above-mentioned grinders to be used for the evaluation of the grinding degree of the silicon nitride ingot, those disclosed in Chemical Engineering Handbook, Oct. 25, 1978, published by Maruzen Company Ltd., p. 279-1283, may for example be used. Namely, a crasher such as a jaw crasher, or a jairetely crasher, and a mill such as a roll crasher, a roller mill or an edge runner, may be employed.

The silicon nitride ingot of the present invention obtained as described above, may be, after the crashing and milling, grinded in a wet system or in a dry system by a usual method by means of, for example, a ball mill, a vibration mill, a jet mill, an attritor mill or a berl mill.

As mentioned above, when the silicon nitride powder of the present invention obtained as described above is subjected to heat treatment at temperature of from 600° to 1,200° C. in an atmosphere from 0.05 to 0.8 atm of $PO_2$, it is possible to obtain a silicon nitride powder having excellent sinterability with an internal oxygen content of at most 0.5% by weight and a surface oxygen content of from 0.5 to 2.0% by weight.

Silicon nitride powder composition

Now, a silicon nitride powder composition will be described which is suitable for use to obtain a sintered body of silicon nitride having a high level of high temperature flexural strength by means of the silicon nitride powder of the present invention.

Preferred typical examples of the silicon nitride powder of the present invention as described above are the following three powders (A), (B) and (C).

(A) A silicon nitride powder having the above-mentioned physical characteristics (1) to (3) and having an $\alpha$-phase content of at least 70%.

(B) A silicon nitride powder having the above-mentioned physical characteristics (1) to (3) and having an $\alpha$-phase content of at most 70%.

(C) A silicon nitride powder having the above-mentioned physical characteristics (1) to (3) and having a surface oxygen content of from 0.5 to 2.0% by weight.

In each of the typical silicon nitride powders of the present invention, the internal oxygen content is as small as at most 0.5% by weight. Accordingly, for the production of a sintered body, use of a sintering aid is important.

The sintering aid is preferably of a magnesia type having an excellent diffusion function, since the silicon nitride powder (A) is hardly sinterable. Specific examples of such sintering aid include a MgO type, a MgO-$Al_2O_3$ type, a MgO-rare earth oxide type, a MgO-$Al_2O_3$-rare earth element oxide type and a MgO-$Al_2O_3$ (spinel)-rare earth element oxide type. Among them, a MgO type i.e. magnesium oxide (MgO) and/or its precursor is preferred. As the precursor substance, magnesium nitride ($Mg(NO_3)_2$), magnesium carbonate ($MgCO_3$) or magnesium hydroxide ($Mg(OH)_2$) may be mentioned.

On the other hand, the silicon nitride powders (B) and (C) have better sinterability than the silicon nitride powder (A). Accordingly, in addition to the above sintering aids, an $Al_2O_3$ type and an $Al_2O_3$-rare earth element oxide type may also be employed.

The above-mentioned rare earth element oxide includes, for example, oxides of Y, La, Ce, Pr, Nd, Sm and Eu.

The sintering aid in the silicon nitride powder composition of the present invention is preferably at most 12% by weight, more preferably at most 10% by weight. Further, a magnesium compound in the sintering aid is preferably within 4% by weight as calculated as MgO.

Further, the silicon nitride powder of the present invention has a low internal oxygen content, whereby a sintering aid of the type which independently forms a liquid phase or of the type which forms a liquid phase at a slightly lower temperature range, may be employed other than the above-mentioned sintering aids. For example, the former may be zinc oxide or nickel oxide, and the latter may be $Y_2O_3$-$Al_2O_3$ which is rich in $Al_2O_3$ to an extent of YAG composition. The amount of addition is up to 12% by weight, since if the amount of the sintering aid is large, the glass phase increases even if the total oxygen content is small.

Sintered body of silicon nitride

Now, the sintered body of silicon nitride of the present invention will be described.

The structure of the silicon nitride sintered body of the present invention comprises $\beta$-prismatic crystals 1 and $\beta$-prismatic crystals 2. The $\beta$-prismatic crystals 1 have a diameter of less than 0.5 $\mu$m and an aspect ratio of from 10 to 25. If the diameter exceeds 0.5 $\mu$m, the density of the sintered body tends to be low, whereby the high temperature flexural strength will not be improved. When the aspect ratio is less than 10, the number of $\beta$-prismatic crystals increases, whereby $\beta$-prismatic crystals having a large aspect ratio tend to hardly form. On the other hand, if the aspect ratio exceeds 25, the number of β-prismatic crystals 1 increases, whereby β-prismatic crystals having a large aspect ratio will not be obtained. Thus, in either case, a high level of high temperature flexural strength can not be expected.

The β-prismatic crystals 2 have a diameter of from 0.5 to 3.0 μm and an aspect ratio of from 10 to 17. If the diameter is less than 0.5 μm, the number of β-prismatic crystals increases, whereby β-prismatic crystals having a high aspect ratio tend to hardly form. On the other hand, if the diameter exceeds 3.0 μm, it will be difficult to obtain a sintered body having an adequate density. Further, if the aspect ratio is less than 10, it will be difficult to obtain adequately developed β-prismatic crystals. On the other hand, if the aspect ratio exceeds 17, it will be difficult to obtain a sintered body having an adequate density. Thus, in either case, a high level of high temperature flexural strength will not be obtained. It is one of the features of the present invention that the sintered body contains such β-prismatic crystals 2 as opposed to the conventional silicon nitride sintered body.

The proportions of the β-prismatic crystals 1 and the β-prismatic crystals 2 are preferably such that in a visible field of the sintered body by a SEM observation (30 μm × 25 μm), the number of β-prismatic crystals 1 is from 10 to 25, the number of β-prismatic crystals 2 is from 6 to 15, the rest being β-prismatic crystals and/or particles having an aspect ratio of less than 5. If the number of β-prismatic crystals 1 is less than 10, β-prismatic crystals other than β-prismatic crystals 1 tend to be predominant, whereby it becomes difficult to obtain β-prismatic crystals having a high aspect ratio. On the other hand, if they exceed 25, β-prismatic crystals 1 become large, β-prismatic crystals having a large aspect ratio tend to hardly form. In either case, the effects for developing a high level of high temperature flexural strength, are small. If the number of β-prismatic crystals 2 is less than 6, β-prismatic crystals other than the β-prismatic crystals 2 tend to be large, whereby β-prismatic crystals having a small aspect ratio tend to form substantially. On the other hand, if they exceed 15, the β-prismatic crystals 2 are substantial, whereby it becomes difficult to obtain a sintered body having an adequate density. Therefore, in either case, the effects for obtaining a high level of high temperature flexural strength, are small.

The proportions of the β-prismatic crystals 1 and the β-prismatic crystals 2 are preferably such that the β-prismatic crystals 1 constitute from 60 to 75%, the rest being the β-prismatic crystals 2. If the β-prismatic crystals 1 are less than 60%, β-prismatic crystals having a large aspect ratio increase, whereby it will be difficult to obtain a sintered body having an adequate density. On the other hand, if they exceeds 75%, it will be difficult to obtain adequately developed β-prismatic crystals having a large aspect ratio.

Figure 4:
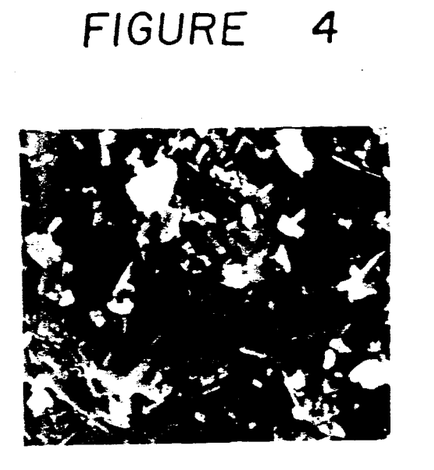
Figure 5:
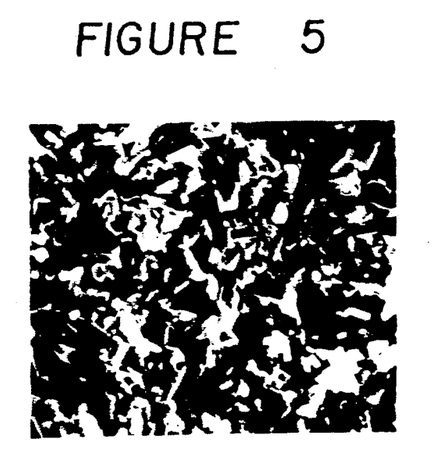

FIG. 4 shows a SEM photograph (3,500 magnifications) showing the crystal structure of a silicon nitride sintered body of the present invention as described above. FIG. 5 shows a SEM photograph (3,500 magnifications) of a silicon nitride sintered body illustrating a crystal structure which is different from the present invention.

The silicon nitridesintered body of the present invention can be produced as described hereinafter, whereby it will be highly strong with a flexural strength at room temperature of at least 900 MPa and a flexural strength at a high temperature of 1,200° C. of at least 700 MPa and it will be highly tough with a toughness of 8.0 MPa·m$^{\frac{1}{2}}$.

Process for producing a silicon nitride sintered body

The silicon nitride sintered body of the present invention can be obtained by a process which comprises adding a sintering aid to the silicon nitride powder of the present invention, further adding a solvent such as 1,1,1-trichloroethane, methanol, ethanol mixing the mixture in a ball mill for from 1 to 4 hours, then drying it and molding it into a desired shape, and sintering it at a temperature of from 1,600° to 1,800° C. for from 2 to 6 hours in an inert gas atmosphere, such as an argon, neon or nitrogen gas atmosphere. For the molding, press molding, injection molding or slip casting may be employed. There is no particular restriction as to the molding pressure or compacting.

By using the silicon nitride powder of the present invention having an α-phase content of more than 70%, preferably at least 80%, it is possible to obtain a silicon nitride sintered body excellent in the high temperature flexural strength. Likewise, by employing the silicon nitride powder of the present invention having an α-phase content of at most 70% and a β-phase content of at least 30%, it is possible to obtain a silicon nitride sintered body having high toughness.

Now, the present invention will be described in further detail with reference to Examples and Comparative Examples. However, it should be understood that the present invention is by no means restricted by such specific Examples.

In each Example, various properties were measured by the following methods.

(1) Total oxygen content T-O (% by weight): As described above.
(2) Internal oxygen content I-O (% by weight): As described above.
(3) Surface oxygen content S-O (% by weight): As described above.
(4) Specific surface area (m$^2$/g): by BET 1 point method by means of Counter Sorb Jr, manufactured by Yuasa Ionics K. K.
(5) Average particle size (μm): by CAPA-700, manufactured by Horiba Seisakusho K. K.
(6) α-Phase content (%): by X-ray diffraction by means of Guiger Flux RAD-IIB Model, manufactured by Rigaku Denki K. K.
(7) Total amount of Fe, Al and Ca (ppm): in accordance with JIS G-1322.
(8) Density of a sintered body (g/cm$^3$): by an Alkimedes method.
(9) Three point flexural strength (MPa): measured by Autograph AG-2000A, manufactured by Shimazu Corporation.
(10) Toughness [$K_{1c}$] (MPa m$^{\frac{1}{2}}$) by Indentation Fracture Method $(K_{1c}\phi/Ha^{\frac{1}{2}})(H/E\phi)^{2/5} = 0.129 (c/a)^{-3/2}$
where E: Young's modulus, H: hardness, a: dent length, c: crack length, $\phi = 3$, load: 20 kg, time for applying the load: 15 seconds

EXAMPLES 1 TO 10 AND COMPARATIVE EXAMPLES 1 TO 7

2.5 kg of a powder mixture comprising 100 parts by weight of a metallic silicon powder having a metallic silicon purity of 99.98% by weight and 10 parts by weight of a silicon nitride powder having an α-phase content of and a specific surface area of 20 m²/g, was compacted to obtain a nitriding sample of about 200×300×50 mm having a bulk density as identified in Table 1. The sample was introduced into an electric furnace and nitrided under the conditions as identified in Table 1. At that time, from another electric furnace in which 2,720 g of solid $CaF_2$ was charged and maintained at a temperature of 1,200° C., $CaF_2(G)$ was introduced at a rate of from 18 to 36 l/hr (25° C.) together with argon gas, and the nitriding was conducted.

In Comparative Examples 1 to 7, the nitriding under heating was conduced under the conditions as identified in Table 1 without introducing $CaF_2(G)$.

TABLE 1

|  | Bulk density of the sample | Nitriding conditions at 1,150–1,450° C. | | |
|---|---|---|---|---|
|  |  | $P_{N_2}$ (atm) | Gas atmosphere for nitriding | Temp. raising rate (°C./hr) |
| Example 1 | 0.7 | 0.65 | $N_2 + NH_3$ | 7 |
| Example 2 | 0.7 | 0.50 | $N_2 + NH_3$ | 7 |
| Example 3 | 0.7 | 0.40 | $N_2 + NH_3$ | 10 |
| Example 4 | 0.7 | 0.75 | $N_2 + NH_3$ | 10 |
| Example 5 | 0.7 | 0.90 | $N_2 + H_2$ | 7 |
| Example 6 | 0.7 | 0.65 | $N_2 + NH_3$ | 5 |
| Example 7 | 1.2 | 0.65 | $N_2 + NH_3$ | 5 |
| Example 8 | 0.7 | 0.65 | $N_2 + H_2$ | 5 |
| Example 9 | 0.7 | 0.50 | $N_2 + NH_3$ | 5 |
| Example 10 | 0.7 | 0.65 | $N_2 + NH_3$ | 3 |
| Comparative Example 1 | 1.2 | 0.75 | $N_2 + NH_3$ | 7 |
| Comparative Example 2 | 1.2 | 0.60 | $N_2 + NH_3$ | 7 |
| Comparative Example 3 | 0.7 | 0.90 | $N_2 + H_2$ | 7 |
| Comparative Example 4 | 0.7 | 0.45 | $N_2 + NH_3$ | 10 |
| Comparative Example 5 | 1.2 | 0.65 | $N_2 + NH_3$ | 7 |
| Comparative Example 6 | 1.2 | 0.95 | $N_2 + NH_3$ | 10 |
| Comparative Example 7 | 0.7 | 0.65 | $N_2 + NH_3$ | 5 |

Silicon nitride ingots thus obtained were observed by a SEM. The ingots of Examples 1 to 10 were all granular, whereas the ingots of Comparative Examples 1 to 7 were whiskers or of polymorphism. As typical representatives, the scanning electron microscopic photographs of the ingots of Example 1 and Comparative Examples 1 and 3 are shown in FIGS. 1, 2 and 3, respectively.

Each silicon nitride ingot thus obtained was crashed and milled (by a jaw crasher and a top grinder) to a particle size of at most 0.2 mm. Further, into a ball mill having an internal capacity of 1 l, 50 g of the grinded, crashed and milled product having a particle size of at most 0.2 mm, 0.5 l of iron balls of 4 φ and g of water were charged, and wet grinding was conducted for 20 hours. Then, the grinded product was subjected to acid treatment with hydrochloric acid and hydrofluoric acid, followed by filtration, drying and disintegrating to obtain a silicon nitride powder as sintering material. With respect to the silicon nitride powder thus obtained, the oxygen contents [total oxygen (T-O), internal oxygen (I-O) and surface oxygen (S-O)], the average particle size, the specific surface area, the content of fine powders of at most 0.2 μm, the content of Fe+Al+Ca, were measured, and the results are shown in Table 2.

TABLE 2

|  | Oxygen contents (% by weight) | | | Powder properties | | | | |
|---|---|---|---|---|---|---|---|---|
|  | T—O | I—O | S—O | Average particle size (μm) | Specific surface area (m²/g) | Content of fine powder of at most 0.2 μm (% by volume) | α-phase content (%) | Total amount of Fe + Al + Ca (ppm) |
| Example 1 | 0.35 | 0.25 | 0.10 | 0.78 | 8 | 2 | 91 | 315 |
| Example 2 | 0.39 | 0.29 | 0.10 | 0.78 | 8 | 2 | 93 | 305 |
| Example 3 | 0.41 | 0.31 | 0.10 | 0.75 | 8 | 3 | 91 | 295 |
| Example 4 | 0.41 | 0.31 | 0.10 | 0.69 | 12 | 3 | 91 | 310 |
| Example 5 | 0.42 | 0.27 | 0.15 | 0.75 | 8 | 2 | 93 | 320 |
| Example 6 | 0.45 | 0.30 | 0.15 | 0.65 | 10 | 3 | 91 | 320 |
| Example 7 | 0.45 | 0.30 | 0.15 | 0.64 | 8 | 2 | 92 | 300 |
| Example 8 | 0.45 | 0.30 | 0.15 | 0.75 | 12 | 3 | 91 | 310 |
| Example 9 | 0.59 | 0.29 | 0.30 | 0.65 | 12 | 3 | 93 | 308 |
| Example 10 | 0.58 | 0.33 | 0.25 | 0.60 | 16 | 7 | 91 | 340 |
| Comparative Example 1 | 0.71 | 0.61* | 0.10 | 0.78 | 7 | 6 | 92 | 298 |
| Comparative Example 2 | 0.91 | 0.71* | 0.20 | 0.65 | 10 | 9* | 93 | 300 |
| Comparative Example 3 | 0.85 | 0.65* | 0.20 | 0.64 | 12 | 10* | 93 | 315 |
| Comparative Example 4 | 2.03 | 1.83* | 0.20 | 0.74 | 12 | 9* | 91 | 320 |
| Comparative Example 5 | 0.66 | 0.51* | 0.15 | 0.74 | 9 | 8* | 92 | 305 |
| Comparative Example 6 | 0.52 | 0.42 | 0.10 | 1.15 | 4* | 3 | 91 | 285 |
| Comparative Example 7 | 2.10 | 1.90* | 0.20 | 0.55 | 18* | 10* | 91 | 380 |

Note:
Symbol * indicates the value outside the scope of the present invention.

To the silicon nitride powder having the powder properties as identified in Table 2, $Y_2O_3$ having an average particle size of 1.2 μm, $Al_2O_3$ having an average particle size of 1.4 μm and MgO having an average particle size of 1.2 μm were added in the proportions of 5% by weight, 2% by weight and 3% by weight, respectively. Further, 1,1,1-trichloroethane was added thereto, and the mixture was mixed in a wet system in a ball mill for 4 hours. After drying, the mixture was formed by a mold under a pressure of 100 kg/cm² into a shape of 6×10×60 mm and then subjected to cold isostatic pressing (CIP) molding under a pressure of 2,700 kg/cm².

The molded product was sintered at a temperature of 1,700° C. for 4 hours in a nitrogen atmosphere under normal pressure to obtain a sintered body.

The sintered body thus obtained was cut into a size of 3×4×40 mm, and the relative density, the three point flexural strength and from the scanning electron microscopic observation, the diameters and aspect ratios of β-prismatic crystals and the numbers of the β-prismatic crystals 1 and the β-prismatic crystals 2 were measured. The results are shown in Table 3.

Further, FIGS. 4 and 5 show the SEM photographs (3,500 magnifications) of the crystal structures of the silicon nitride sintered bodies obtained in the Examples 1 and Comparative Example 5, respectively. FIG. 4 shows a heterogeneous structure which contains a number of β-prismatic crystals having an aspect ratio of at least 10, whereas FIG. 5 shows a uniform structure having a relatively low aspect ratio (about 5).

was from 1,150° C. to 1,350° C. Further, in Example 16, the halogen gas was introduced not from a separate furnace but by placing solid CaF$_2$ in the vicinity of the nitriding sample in the same furnace and the nitriding was conducted under its sublimation.

The silicon nitride thus obtained was grinded in a wet system in the same manner as in Example 1 to obtain a silicon nitride powder. The powder properties thereof are shown in Table 4.

The silicon nitride powder thus obtained was sub-

TABLE 3

| | Properties of the sintered body | | | β-Prismatic crystals 1 | | | β-Prismatic crystals 2 | | |
|---|---|---|---|---|---|---|---|---|---|
| | Density (g/cm$^3$) | σR.T. (MPa) | σ1200° C. (MPa) | Number of crystals observed in a unit visual field (number) | Diameter (μm · less) | Aspect ratio | Number of crystals observed in a unit visual field (number) | Diameter (μm) | Aspect ratio |
| Example 1 | 3.19 | 980 | 830 | 13 | 0.5 | 12 | 6 | 0.6 | 13 |
| Example 2 | 3.18 | 920 | 760 | 13 | 0.4 | 15 | 7 | 1.0 | 13 |
| Example 3 | 3.18 | 950 | 750 | 13 | 0.4 | 12 | 6 | 1.2 | 11 |
| Example 4 | 3.17 | 980 | 790 | 13 | 0.5 | 10 | 6 | 1.2 | 15 |
| Example 5 | 3.19 | 1050 | 890 | 15 | 0.4 | 12 | 10 | 1.8 | 12 |
| Example 6 | 3.17 | 940 | 740 | 20 | 0.5 | 18 | 12 | 1.2 | 14 |
| Example 7 | 3.17 | 930 | 840 | 24 | 0.4 | 10 | 14 | 2.5 | 15 |
| Example 8 | 3.17 | 980 | 740 | 16 | 0.4 | 11 | 10 | 1.6 | 11 |
| Example 9 | 3.18 | 950 | 800 | 14 | 0.4 | 12 | 8 | 1.2 | 14 |
| Example 10 | 3.18 | 1020 | 720 | 20 | 0.4 | 12 | 4 | 0.6 | 12 |
| Comparative Example 1 | 3.13 | 950 | 580 | 9 | 0.5 | 8* | 5 | 0.6 | 20* |
| Comparative Example 2 | 3.17 | 930 | 650 | 30 | 0.5 | 9* | 16 | 0.8 | 8* |
| Comparative Example 3 | 3.14 | 980 | 640 | 8 | 0.4 | 9* | 5 | 1.2 | 20* |
| Comparative Example 4 | 3.18 | 950 | 490 | 26 | 0.5 | 8* | 5 | 1.8 | 8* |
| Comparative Example 5 | 3.12 | 940 | 550 | 8 | 0.5 | 26* | 5 | 3.5 | 18* |
| Comparative Example 6 | 3.10 | 876 | 470 | 8 | 0.5 | 7* | 5 | 3.9 | 18* |
| Comparative Example 7 | 3.18 | 1020 | 620 | 26 | 0.4 | 12 | Not observed | | |

Note 1: "σR.T." and "σ1200° C." indicate the flexural strength at room temperature and at a temperature of 1,200° C., respectively.
Note 2: Each of Examples 1 to 7 does not contain β-prismatic crystals 1 and β-prismatic crystals 2 which satisfy the conditions of the present invention.
Note 3: Symbol * indicates the value outside the scope of the present invention.

EXAMPLES 11 TO 16

In these Examples, the type of the halogen gas was changed. The nitriding under heating was conducted under the nitriding conditions as identified in Table 4 by using the same material, nitriding sample and charging amount as used in Example 1. The manner of introducing the halogen gas was the same as in Example 1. In Example 11, the supply temperature of the halogen gas jected to sintering in the same manner as in Example 1 to obtain a sintered body. The evaluation of the sintered body was conducted in the same manner as in Example 1. The results are shown in Table 4.

With respect to the β-prismatic crystals 1 and β-prismatic crystals 2 of the sintered bodies obtained in Examples 11 to 16, the SEM observation was conducted, and in each case, the results were substantially the same as in Example 1.

TABLE 4

| | Starting materials | | | Nitriding conditions at 1,150–1,450° C. | | | | Powder properties Oxygen contents (% by weight) | | |
|---|---|---|---|---|---|---|---|---|---|---|
| | Particle size of metallic silicon | Silicon nitride (parts by weight) | Bulk density of the sample | P$_{N2}$ (atm) | Gas atmosphere for nitriding | Halogen gas Type | l/hr | Temp. raising rate (°C./hr) | T—O | I—O | S—O |
| Example 11 | At most 88 μm | 18 | 0.7 | 0.65 | N$_2$ + NH$_3$ | CaF$_2$ | 25 | 7 | 0.45 | 0.35 | 0.10 |
| Example 12 | At most 88 μm | 18 | 0.7 | 0.65 | N$_2$ + NH$_3$ | MgF$_2$ | 25 | 7 | 0.50 | 0.35 | 0.15 |
| Example 13 | At most 88 μm | 18 | 0.7 | 0.65 | N$_2$ + NH$_3$ | CaCl$_2$ | 25 | 7 | 0.44 | 0.34 | 0.10 |
| Example 14 | At most 88 μm | 18 | 0.7 | 0.65 | N$_2$ + NH$_3$ | MgCl$_2$ | 25 | 7 | 0.40 | 0.30 | 0.10 |
| Example 15 | At most 88 μm | 18 | 0.7 | 0.65 | N$_2$ + NH$_3$ | LiF | 25 | 7 | 0.45 | 0.35 | 0.10 |
| Example 16 | At most 88 μm | 18 | 0.7 | 0.65 | N$_2$ + NH$_3$ | CaF$_2$ + MgF$_2$ | 25 | 7 | 0.35 | 0.25 | 0.10 |

| | Powder properties | | | | | Properties of the sintered body | | |
|---|---|---|---|---|---|---|---|---|
| | Average particle size (μm) | Specific surface area (m$^2$/g) | Fine powder of at most 0.2 μm (% by volume) | α-Phase content (%) | Total amount of Fe + Al + Cu (ppm) | Density (g/cm$^3$) | σR.T. (MPa) | σ1200° C. (MPa) |
| Example | 0.53 | 11 | 3 | 90 | 305 | 3.17 | 920 | 800 |

TABLE 4-continued

| | | | | | | | | |
|---|---|---|---|---|---|---|---|---|
| Example 11 | 0.54 | 7 | 2 | 90 | 310 | 3.17 | 910 | 810 |
| Example 12 | 0.60 | 7 | 4 | 90 | 318 | 3.18 | 870 | 750 |
| Example 13 | 0.54 | 8 | 3 | 91 | 320 | 3.17 | 910 | 740 |
| Example 14 | 0.48 | 10 | 3 | 90 | 340 | 3.18 | 940 | 800 |
| Example 15 | 0.60 | 7 | 2 | 91 | 305 | 3.17 | 920 | 810 |
| Example 16 | | | | | | | | |

Note:
In Example 11, CaF$_2$ gas was introduced during the temperature raising from 1,150 to 1,350° C., but during the subsequent temperature raising, no CaF$_2$ gas was introduced.

EXAMPLES 17 TO 23

In these Examples, the type and the amount of the sintering aid were changed. In Examples 17 to 23, sintered bodies were produced in the same manner as in Example 1 except that the sintering aid was changed as identified in Table 5.

raising rate is the value within the temperature range of from 1,100° to 1,450° C. Further, CaF$_2$(G) was supplied to the nitriding furnace in the same manner as in Example 1.

The silicon nitride ingot obtained, was grinded in the same manner as in Example 1 to obtain a silicon nitride powder.

TABLE 5

| | Silicon nitride powder composition | | Properties of the sintered body | | |
|---|---|---|---|---|---|
| | Silicon nitride powder (% by weight) | Sintering aid (% by weight) | Density (g/cm$^3$) | σR.T. (MPa) | σ1200° C. (MPa) |
| Example 17 | 89 | MgO = 4, Al$_2$O$_3$ = 2, Y$_2$O$_3$ = 5 | 3.17 | 900 | 790 |
| Example 18 | 91 | MgO = 2, Al$_2$O$_3$ = 2, Y$_2$O$_3$ = 5 | 3.17 | 920 | 810 |
| Example 19 | 92 | MgO = 2, Al$_2$O$_3$ = 2, La$_2$O$_3$ = 5 | 3.18 | 910 | 800 |
| Example 20 | 90 | MgO = 3, Al$_2$O$_3$ = 1, Nb$_2$O$_3$ = 6 | 3.17 | 890 | 770 |
| Example 21 | 88.8 | MgCO$_3$ = 4.2, Al$_2$O$_3$ = 2, Y$_2$O$_3$ = 5 | 3.18 | 880 | 790 |
| Example 22 | 92.2 | MgO.Al$_2$O$_3$ = 2.8, Y$_2$O$_3$ = 5 | 3.18 | 920 | 720 |
| Example 23 | 91.5 | MgO.Al$_2$O$_3$ = 3.5, La$_2$O$_3$ = 5 | 3.17 | 950 | 750 |

EXAMPLES 24 TO 26

In these Examples, the α-phase content of the silicon nitride powder was changed.

10 Parts by weight of a silicon nitride powder having an α-phase content of 10% and a specific surface area of 12 m$^2$/g, was added and mixed to 100 parts by weight of a metallic silicon powder having a particle size of at most 88 μm and a silicon purity of 99.98% by weight. Using the mixture, a nitriding sample having a bulk density as identified in Table 6, a size of 150×150 mm and a thickness as identified in Table 6, was compacted and nitrided in an electric furnace. The nitriding conditions were as identified in Table 6. The temperature Then, 5 parts by weight of Y$_2$O$_3$ having an average particle size of 1.5 μm and 2 parts by weight of Al$_2$O$_3$ having an average particle size of 0.8 μm were added as sintering aids to 93 parts by weight of this silicon nitride powder, and 1,1,1-trichloroethane was added. The mixture was mixed in a wet system in a ball mill for 4 hours. After drying, the mixture was formed by a mold under a pressure of 100 kg/cm$^2$ into a shape of 6×10×60 mm, and then it was subjected to CIP under a pressure of 2,700 kg/cm$^2$. The molded product was set in a carbon crucible and sintered at a temperature of 1,800° C. for 4 hours in a nitrogen gas atmosphere to obtain a sintered body. The physical properties of the sintered bodies were measured, and the results are shown in Table 6.

TABLE 6

| | Siliconnitride powder composition | | Nitriding conditions | | | | Powder properties |
|---|---|---|---|---|---|---|---|
| | Bulk density of the sample (g/cm$^3$) | Thickness (mm) | P$_{N2}$ (atm) | Gas atmosphere for nitriding | CaF$_2$ | Temp. raising rate (°C./hr) | α-Phase content (%) |
| Example 24 | 0.7 | 30 | 0.90 | N$_2$ + NH$_3$ | Yes | 50 | 10 |
| Example 25 | 0.7 | 30 | 0.95 | N$_2$ + NH$_3$ | Yes | 50 | 30 |
| Example 26 | 0.7 | 30 | 0.80 | N$_2$ + NH$_3$ | Yes | 10 | 91 |

| | Powder properties | | | | | | | Properties of the sintered body | | |
|---|---|---|---|---|---|---|---|---|---|---|
| | Oxygen contents (% by weight) | | | Specific surface area (m$^2$/g) | Average particle size (μm) | Fine powder of at most 0.2 μm (% by volume) | Total amount of Fe + Al + Ca (ppm) | Density (g/cm$^3$) | σR.T. (MPa) | K$_{1c}$ (MPa·m$^{\frac{1}{2}}$) |
| | T—O | I—O | S—O | | | | | | | |
| Example 24 | 0.70 | 0.35 | 0.25 | 8 | 0.80 | 1.5 | 300 | 3.18 | 970 | 8.6 |
| Example | 0.75 | 0.45 | 0.30 | 11 | 0.70 | 2.2 | 400 | 3.17 | 1020 | 8.5 |

TABLE 6-continued

| | | | | | | | | | |
|---|---|---|---|---|---|---|---|---|---|
| 25 Example 26 | 0.55 | 0.45 | 0.10 | 8 | 0.70 | 3.3 | 300 | 2.98 | 800 | 7.2 |

EXAMPLES 27 TO 32 AND COMPARATIVE EXAMPLES 8 TO 9

In these Examples, the surface oxygen content was changed. The silicon nitride powders obtained in Examples 2 and 9 and Comparative Example 1 as identified in Table 7 were used as the starting materials, and they were subjected to heat treatment under the conditions as identified in Table 8, to obtain the silicon nitride powders having the physical properties as identified in Table 8.

TABLE 7

| Silicon nitride powder | | Oxygen content (% by weight) | | |
|---|---|---|---|---|
| Identity | Production | T—O | I—O | S—O |
| A | Example 2 | 0.39 | 0.29 | 0.10 |
| B | Example 9 | 0.59 | 0.29 | 0.30 |
| C | Comparative Example 1 | 0.78 | 0.68 | 0.10 |

TABLE 8

| | Silicon nitride powder identity | Treating conditions | | | Powder properties | | |
|---|---|---|---|---|---|---|---|
| | | $PO_2$ (atm) | Treating temp. (°C.) | Treating time (hr) | Oxygen content (% by weight) | | |
| | | | | | T—O | I—O | S—O |
| Example 27 | A | 0.2 | 850 | 1 | 1.01 | 0.31 | 0.70 |
| Example 28 | A | 0.2 | 850 | 3 | 1.72 | 0.32 | 1.40 |
| Example 29 | A | 0.1 | 850 | 3 | 1.44 | 0.32 | 1.10 |
| Example 30 | A | 0.2 | 950 | 1 | 1.49 | 0.29 | 1.20 |
| Example 31 | B | 0.2 | 850 | 1 | 1.20 | 0.30 | 0.90 |
| Example 32 | B | 0.7 | 850 | 1 | 1.91 | 0.31 | 1.60 |
| Comparative Example 8 | C | 0.2 | 850 | 2 | 1.68 | 0.68 | 1.00 |
| Comparative Example 9 | C | 0.2 | 750 | 2 | 1.40 | 1.00 | 0.40 |

Then, sintered bodies were produced in the same manner as in Examples 24 to 26 for the evaluation of the performance of the obtained silicon nitride powders.

The physical properties of the sintered bodies thereby obtained were measured, and the results are shown in Table 9.

TABLE 9

| | Properties of the sintered body | | |
|---|---|---|---|
| | Relative density (%) | σR.T. (MPa) | σ1200° C. (MPa) |
| Example 27 | 98 | 1030 | 810 |
| Example 28 | 99 | 1150 | 780 |
| Example 29 | 99 | 1130 | 800 |
| Example 30 | 99 | 1150 | 790 |
| Example 31 | 98 | 1050 | 820 |
| Example 32 | 99 | 1170 | 770 |
| Comparative Example 8 | 98 | 1050 | 570 |
| Comparative Example 9 | 94 | 720 | 450 |

EXAMPLES 33 TO 37 AND COMPARATIVE EXAMPLES 10 AND 11

In these Examples, the sintering conditions were changed. The sintered bodies were produced in the same manner as in Example 1 using the same silicon nitride powder composition as used in Example 1, except that the sintering was conducted under the conditions as identified in Table 10.. The results are shown in Table 10.

TABLE 10

| | Sintering conditions | | | | Properties of the sintered body | | |
|---|---|---|---|---|---|---|---|
| | Gas atmosphere for nitriding | Temp. (°C.) | Time (hr) | Pressure (kg/cm²) | Density (g/cm³) | σR.T. (MPa) | σ1200° C. (MPa) |
| Example 1 | $N_2$ | 1700 | 5 | 1 | 3.18 | 980 | 890 |
| Example 33 | $N_2 + H_2$ | 1750 | 5 | 1 | 3.17 | 920 | 800 |
| Example 34 | $N_2$ | 1750 | 3 | 1 | 3.18 | 950 | 850 |
| Example 35 | $N_2 + H_2$ | 1700 | 8 | 1 | 3.17 | 900 | 800 |
| Example 36 | Ar | 1750 | 5 | 1 | 3.18 | 920 | 820 |
| Example 37 | $N_2$ | 1700 | 5 | 9 | 3.17 | 910 | 770 |
| Comparative Example 10 | $N_2$ | 1550 | 5 | 1 | 3.08 | 650 | 350 |
| Comparative Example 11 | $N_2$ | 1850 | 5 | 1 | 3.13 | 770 | 470 |

What is claimed is:

1. A silicon nitride powder prepared by nitriding a metallic silicon powder in an atmosphere containing nitrogen and/or ammonia, while supplying at least one halide selected from the group consisting of alkali metal halides and alkaline earth metal halides, in a gas state, continuously, intermittently or at once, to obtain a silicon nitride ingot, followed by grinding of the ingot and having the following physical characteristics (1) to (3):
   (1) the internal oxygen content in the form of a solid solution is at most 0.5% by weight, (2) the specific surface area is from 6 to 16 m²/g, and
(3) the content of fine powder of at most 0.2 μm is at most 7% by volume.

2. The silicon nitride powder according to claim 1, wherein the content of fine powder of at most 0.2 μm is at most 3% by volume.

3. The silicon nitride powder according to claim 1, which has an average particle size of from 0.3 to 0.8 μm.

4. The silicon nitride powder according to claim 1, having a total content of Fe, Al and Ca of at most 1,000 ppm.

5. The silicon nitride powder according to claim 1, having an α-phase content of more than 70% and at most 80%.

6. The silicon nitride powder according to claim 1 having an α-phase content of at most 70% and a β-phase content of at least 30%.

7. The silicon nitride powder according to claim 4, wherein the total content of Fe, Al and Ca is at most 500 ppm.

8. The silicon powder according to claim 1, having a surface oxygen content in the form of a hydroxide or oxide of from 0.5 to 2.0% by weight.

9. A silicon nitride powder composition comprising a silicon nitride powder of claim 1 and a sintering aid.

10. The silicon nitride powder composition according to claim 9, wherein the sintering aid is at least one member selected from the group consisting of sintering aids of MgO type, MgO-Al₂O₃ type, MgO-rare earth element oxide type, MgO-al₂O₃-rare earth element oxide type, MgO·Al₂O₃ (spinel)-rare earth element oxide type and Al₂O₃-rare earth element oxide type.

11. The silicon nitride powder composition according to claim 9, wherein the rare earth element oxide is at least one member selected from the group consisting of oxides of Y, La, Ce, Pr, Nd, Sm and Eu.

12. The silicon nitride powder composition according to claim 10, which comprises at least 88% by weight of the silicon nitride powder and at most 12% by weight of the sintering aid.

13. A silicon nitride sintered body prepared by sintering the silicon nitride powder composition of claim 9, having β-prismatic crystals (A) having an aspect ratio of from 10 to 25 and a diameter of less than 0.5 micrometers as determined by the scanning electron microscope observation and β-prismatic crystals (B) having an aspect ratio of from 10 to 17 and a diameter of from 0.5 to 3.0 micrometers as determined by the scanning electron microscope observation.

14. A process for producing a silicon nitride sintered body, which comprises molding a silicon nitride powder composition of claim 9, followed by sintering in an inert gas atmosphere at a temperature of from 1,600° to 1,800° C. for from 2 to 6 hours.

15. The process for producing a silicon nitride sintered body according to claim 14, wherein the molding method is press molding, injection molding or slip casting.

16. A process for producing a silicon nitride powder which comprises nitriding a metallic silicon powder in an atmosphere containing nitrogen and/or ammonia while supplying at least one halide selected from the group consisting of alkali metal halides and alkaline earth metal halides, in a gas state, continuously, intermittently, or at once, to obtain a silicon nitride ingot, followed by grinding of the ingot.

17. The process for producing a silicon nitride powder according to claim 16, wherein the halide is supplied within a temperature range of from 1,150° C. to 1,450° C.

18. The process for producing a silicon nitride powder according to claim 16, wherein the halide is at least one member selected from the group consisting of fluorides of Ca, Mg and Li.

19. The process for producing a silicon nitride powder according to claim 16, wherein the silicon nitride powder obtained by grinding the silicon nitride ingot is further heat-treated at a temperature of from 600° to 1,200° C. in an atmosphere of from 0.05 to 0.8 atm of partial pressure of oxygen gas.

20. The silicon nitride sintered body according to claim 13, which has a flexural strength at room temperature of at least 900 MPa and a flexural strength at a high temperature of 1,200° C. of at least 700 MPa.

21. The silicon nitride sintered body according to claim 13, which has a toughness of at least 8.0 MPa·m$^{\frac{1}{2}}$ at room temperature.

* * * * *